United States Patent [19]

Christian et al.

[11] 4,228,226
[45] Oct. 14, 1980

[54] NONAQUEOUS SECONDARY CELL USING VANADIUM OXIDE POSITIVE ELECTRODE

[75] Inventors: Paul A. Christian, Princeton; Francis J. Di Salvo, Jr., Florham Park; Donald W. Murphy, Warren, all of N.J.

[73] Assignee: Bell Telephone Laboratories, Incorporated, Murray Hill, N.J.

[21] Appl. No.: 950,130

[22] Filed: Oct. 10, 1978

[51] Int. Cl.$^3$ .......................................... H01M 10/40
[52] U.S. Cl. ..................................... 429/194; 429/218
[58] Field of Search ........................ 429/194, 197, 218

[56] References Cited

U.S. PATENT DOCUMENTS 3,655,585  4/1972  Dey et al. ............................ 429/218

FOREIGN PATENT DOCUMENTS 981329  1/1976  Canada ..................................... 429/194

OTHER PUBLICATIONS

Walk et al., Electrochemical Soc. Meeting Abstract #27, Toronto, May 11–16 (1975).
Manganese Dioxide Symposium Proceedings 1 (1975), pp. 384–401.
Journal of the Electrochemical Society 124, p. 968, Jul. 1977.
Journal of the Electrochemical Society 121, pp. 656–660 (1974).

Primary Examiner—Donald L. Walton
Attorney, Agent, or Firm—Richard D. Laumann

[57] ABSTRACT

Nonaqueous secondary cells utilizing vanadium oxides having the nominal stoichiometry $VO_{2+y}$; y greater than or equal to 0.0 and less than or equal to approximately 0.4 as the active positive electrode material and lithium metal as the active negative electrode material are described.

8 Claims, 6 Drawing Figures

NONAQUEOUS SECONDARY CELL USING VANADIUM OXIDE POSITIVE ELECTRODE

TECHNICAL FIELD

This invention deals with nonaqueous secondary cells.

BACKGROUND OF THE INVENTION

There has been considerable interest in recent years in nonaqueous secondary cells because of the possibilities afforded of obtaining cells useful for small electronic applications, e.g., calculators, circuit boards, and watches, which overcome drawbacks, e.g., self-discharge and low voltage, of the presently used nickel-cadmium cells. Many materials have been considered as candidates for the electrode materials in such cells. Classes of materials that undergo topochemical reactions are potentially useful as the active positive electrode materials in secondary cells and thus have received particular attention. Broadly speaking, topochemical reactions involve a host lattice into which a guest species is inserted with the product maintaining the essential structural features of the host. When the structural changes are minimal, this process is called intercalation and is likely to be readily reversible. This reversibility of the intercalation reaction may form the basis for a secondary cell if the reaction is of the oxidation-reduction type.

Topochemical reactions of alkali metals and several types of transition metal compounds appear to be especially promising candidates for use in secondary cells. The use of layered transition metal selenides and sulfides as the active positive electrode materials in such cells has received must attention. However, transition metal oxides, other factors equal, are more desirable electrode materials than are sulfides and selenides because they may afford higher energy densities per unit weight and/or per unit volume. Additionally, oxides are less noxious than are sulfides and selenides or decomposition.

Several transition metal oxides have been studied for use as electrode materials. For example, $V_2O_5$ was used in a primary cell by Dey et al., U.S. Pat. No. 3,655,585; $MoO_3$ was studied by Dampier, *Journal of the Electrochemical Society* 121, 656 (1974); and $MnO_2$ was studied by Ikeda et al., *Manganese Dioxide Symposium* 1, 384 (1975). The use of $V_2O_5$ in a secondary cell was reported by Walk and Gore, Electrochemical Society Meeting, Paper No. 27, Toronto, May 11–16 (1975). However, secondary cells using $V_2O_5$ as the positive electrode material suffer from several drawbacks, e.g., the low electronic conductivity of $V_2O_5$ and its irreversible reduction at moderate potentials. Additionally, electrolyte oxidation occurs during charging of such cells.

SUMMARY OF THE INVENTION

It has been found that vanadium oxides having the nominal stoichiometry $VO_{2+y}$, y greater than or equal to 0.0 and less than or equal to approximately 0.4, are useful as positive electrode materials in nonaqueous cells using lithium metal as the negative electrodes. In one preferred embodiment, the active positive electrode material has the nominal stoichiometry $V_6O_{13}$, i.e., y is approximately 0.1 to 0.2.

The included compositions have an open structure and encompass a series of vanadium oxides with closely related shear structures found between the limiting compositions of $VO_2$ and $VO_{2.4}$. The active positive electrode material includes at least one of the vanadium oxides present within the specified composition range. The electrical conductivity of the positive electrode may be increased by intimately mixing an electrically conductive material, such as graphite, with the active positive electrode material.

DETAILED DESCRIPTION

Figure 1:
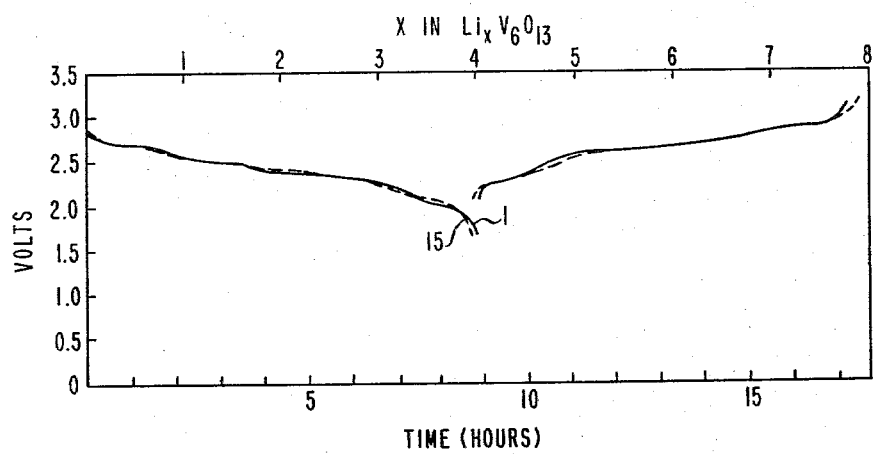
FIG. 1 plots the cell voltage for a cell using $V_6O_{13}$ as the active positive electrode material against both time, in hours, and lithium content, represented by x.

The lattice structures of the vanadium oxides included within the nominal stoichiometry range $VO_{2+y}$; $0 < y < 0.4$; may be visualized as constructed from basic building blocks of distorted octahedra. These octahedra have vanadium atoms at the center and are connected by edge or corner shared oxygen atoms. Several distinct vanadium oxide phases are known within the stoichiometric range. The structures of the phases included within this stoichiometry range can best be described as double shear structures derived from a hypothetical $VO_3$ with the $ReO_3$ structure.

The known phases within the stoichiometry range include $VO_2(B)$, $V_6O_{13}$, $V_4O_9$ and $V_3O_7$ although other phases may exist. Members of this series of structures are discussed in detail in *Acta Crystallographica* 30A, pp. 834–837 (1977), *Acta Chemica Scandinavica* 25, pp. 2675–2687 (1971), *Chemistry Letters*, pp. 1131–1135 (1975) and *Journal of Solid State Chemistry* 17, pp. 1–438 (1976) and in reference cited therein.

A number of preparative methods for the included vanadium oxide stoichiometries have been reported in references such as those in the preceding paragraph. These methods include the stoichiometric reactions of $V_2O_5$ with appropriate quantities of vanadium metal or $V_2O_3$ at high temperatures in vacuo, the reduction, at lower temperatures, of $V_2O_5$ or $NH_4VO_3$ with gaseous reducing agents such as $H_2$, $NH_3$ or $SO_2$ and the thermal decomposition of $NH_4VO_3$ in an inert atmosphere. A preferred method for preparation of $VO_2(B)$ is the reduction of $V_2O_5$ with $H_2$ at 325 degrees C.

Vanadium oxides with nominal compositions close to $V_6O_{13}$, i.e., oxides within the stoichiometry range from $VO_{2.1}$ to $VO_{2.2}$, are readily prepared by the thermal decomposition of $NH_4VO_3$ at a controlled rate in an inert (such as argon or nitrogen) or reducing (such as $H_2$, $NH_3$ or $SO_2$) atmosphere at a temperature of approximately 450 degrees C. The $V_6O_{13}$ prepared by thermal decomposition of $NH_4VO_3$ may be heat treated by approximately 650 degrees in an inert atmosphere to modify the performance of the electrode. Heat treatment times are typically 16 hours although longer times will be required at lower temperatures. The precise oxide composition of vanadium oxides prepared in this manner may vary but will be referred to also as $V_6O_{13}$. Cells containing $V_6O_{13}$ as the active positive electrode material, prepared without heat treatment, have a higher capacity (one Li per V) than those containing $V_6O_{13}$ prepared at higher temperatures. The reasons for the higher capacity are not known with certainty. However, it is believed that $V_6O_{13}$ prepared by the thermal decomposition of $NH_4VO_3$ contains many lattice defects. These defects may serve as sites of nucleation for microdomains of related shear structures such as the very similar $VO_2(B)$. The formation of such microdomains in a $V_6O_{13}$ lattice through electron beam heating was observed by Horiuchi, et al., *Acta Crystallographica A*31, pp. 660–664 (1975). The presence of these regions may enhance lithium ion diffusion into the $V_6O_{13}$ lattice and result in significantly higher observed cell capacities.

Lithiated vanadium oxides of the composition $Li_xVO_{2+y}$ may be prepared chemically by treatment of the $VO_{2+y}$ with n-butyllithium in hexane. Unit cell parameters derived from x-ray powder diffraction data suggest that the compositions $Li_xV_6O_{13}$ have a structure very similar to that of the monoclinic $V_6O_{13}$ prepared at high temperatures, e.g.,

| | | | | | | |
|---|---|---|---|---|---|---|
| $V_6O_{13}$ | : | a = 11.92 | b = 3.68 | c = 10.14 | $\beta=\beta$ 100.87 |
| $Li_4V_6O_{13}$ | : | a = 11.89 | b = 3.98 | c = 10.24 | $\beta$ = 100.37 |

Similarly, unit cell parameters derived from x-ray powder diffraction data suggest that the structure of lithiated $VO_2(B)$ is similar to that of the parent $VO_2(B)$, e.g.,

| | | | | |
|---|---|---|---|---|
| $VO_2(B)$ | a = 12.03 | b = 3.693 | c = 6.42 | $\beta$ = 106.6 |
| $Li_{0.5}VO_2(B)$ | a = 12.03 | b = 4.0 | c = 6.42 | $\beta$= 106.6 |

Cells may be constructed by any of the well-known and conventional methods in which the positive electrode containing the vanadium oxide or oxides as the active material is spaced from a suitable negative electrode with both electrodes in mutual contact with an electrically conductive nonaqueous electrolyte. The electrolyte should be nonreactive with both the positive and negative electrode materials. Suitable electrolytes include lithium hexafluoroarsenate or perchlorate in propylene carbonate and lithium tetramethylboron in dioxane. Suitable current collectors contact the positive electrode and negative electrode and permit an electrical current to be drawn by an external circuit.

The cells may be manufactured in either the charged or discharged state. If manufactured in the charged state, the vanadium oxide or oxides may be prepared as described above and used directly as the positive electrode material. Use of $Li_xVO_{2+y}$ as the positive electrode material allows the manufacture of the cell in the discharged state.

It is desirable that the positive electrode maintain its electrical conductivity at all states of charge. The conductivity of $Li_xV_6O_{13}$ decreases with increasing values of x. While the pressed powder conductivity of $V_6O_{13}$ is on the order of $10^2$ (ohm-cm)$^{-1}$, that of $Li_4V_6O_{13}$ is approximately three orders of magnitude smaller. This increase in resistance correspondingly results in increased dissipative losses and reduced rates of lithium ion diffusion within the $V_6O_{13}$ lattice. However, conductivity may be increased by adding an electrically conducting, but chemically nonreactive, material, such as graphite, to the positive electrode. For the less conductive oxides, e.g., $V_4O_9$, which has a pressed powder conductivity on the order of $10^{-6}$ (ohm-cm)$^{-1}$, some $V_6O_{13}$ may be added to the positive electrode either in addition to or instead of graphite.

The superior performance especially of $V_6O_{13}$ and $VO_2(B)$, compared to $V_2O_5$, as active positive electrode materials in nonaqueous secondary cells may be attributed to several factors. Apart from their higher electronic conductivity, the presence of more edge sharing and fewer corner sharing $VO_6$ octahedra in the crystal lattices of $V_6O_{13}$ and $VO_2(B)$ imparts increased resistance to shearing of their lattices. Further, the lower observed cell potentials of $V_6O_{13}$ and $VO_2(B)$ compared to $V_2O_5$ minimize electrolyte oxidation on charging.

The following quoted theoretical theoretical capacities are determined on the basis of one lithium atom per vanadium atom. No self-discharge was observed over a period of several weeks.

EXAMPLE 1

FIG. 1 relates, for a cell using $V_6O_{13}$ as the active positive electrode material and having a lithium negative electrode, cell voltage, in volts, on the ordinate and both time, in hours, and lithium content on the abscissa. The positive electrode contained 8.5 mg of $V_6O_{13}$ prepared from $V_2O_5$ and V at 650 degrees C. and was cycled at 0.2 ma. The electrolyte was 1.0 M $LiAsF_6$ dissolved in propylene carbonate. The cycle numbers are indicated. Theoretical cell capacity was approximately 2.66 ma·hr.

EXAMPLE 2

Figure 2:
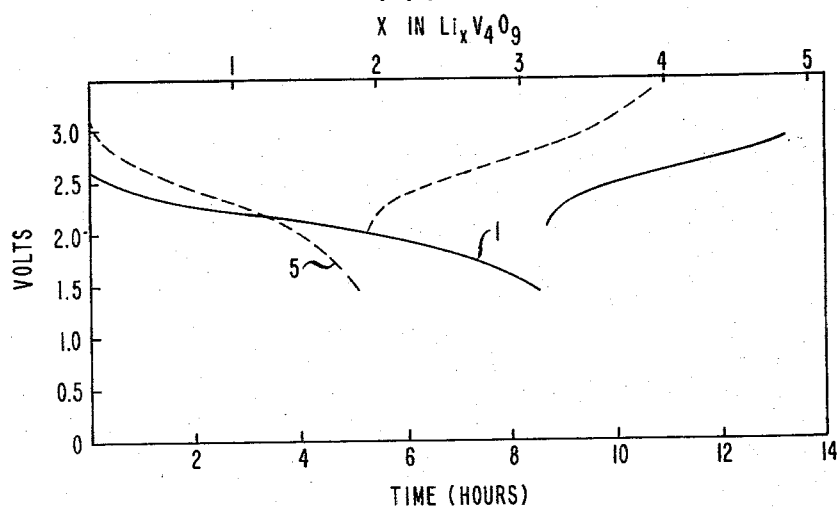
FIG. 2 plots the cell voltage for a cell using $V_4O_9$ as the active positive electrode material against both time, in hours, and lithium content, represented by x.

FIG. 2 relates, for a cell using $V_4O_9$ as the active positive electrode material and having a lithium negative electrode, cell voltage, in volts, on the ordinate, and both time, in hours, and lithium content on the abscissa. The positive electrode contained 7.0 mg of $V_4O_9$ and 6.8 mg of graphite added to increase the electrical conductivity of the positive electrode. The cell was cycled at 0.2 ma. The cycle numbers are indicated. The electrolyte was 1.0 M $LiAsF_6$ dissolved in propylene carbonate. Theoretical cell capacity was approximately 2.16 ma·hr.

EXAMPLE 3

Figure 3:
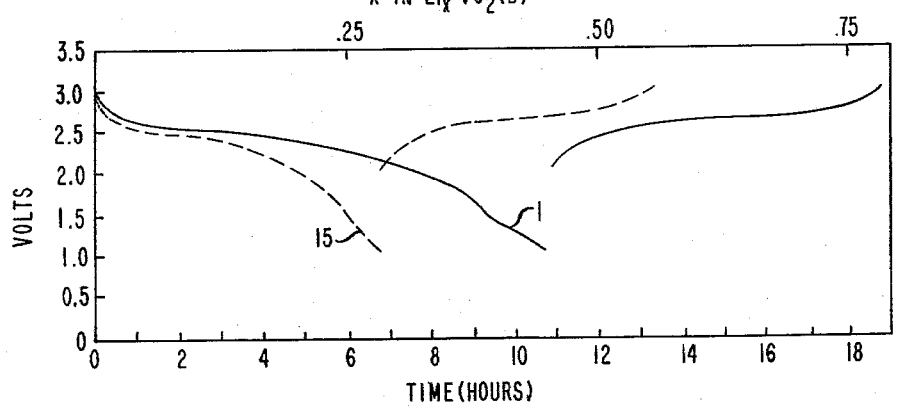
FIG. 3 plots the cell voltage for a cell using $VO_2(B)$ as the active positive electrode material against both time, in hours, and lithium content, represented by x.

FIG. 3 relates, for a cell using $VO_2(B)$ as the active positive electrode material and having a lithium negative electrode, cell voltage, in volts, on the ordinate, and both time, in hours, and lithium content on the abscissa. The cell contained 14.7 mg of $VO_2(B)$ and was cycled at 0.2 ma. The cycle numbers are indicated. The electrolyte was 1.0 M $LiClO_4$ in propylene carbonate. Theoretical cell capacity was approximately 4.75 ma·hr.

EXAMPLE 4

Figure 4:
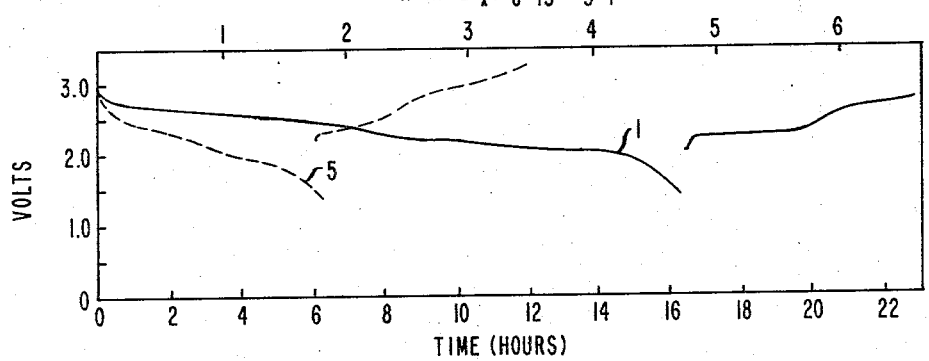
FIG. 4 plots the cell voltage for a cell using a mixture of $V_6O_{13}$ and $V_3O_7$ as the active positive electrode material against both time, in hours, and lithium content, represented by x.

FIG. 4 relates, for a cell using an intimate mixture of $V_6O_{13}$ and $V_3O_7$ as the active positive electrode material and having a lithium negative electrode, cell voltage, in volts, on the ordinate, and both time, in hours, and lithium content on the abscissa. The cell contained a total of 2.2 mg of $V_6O_{13}$ and 10.9 mg of $V_3O_7$. The cell was cycled at 0.2 ma. The cycle numbers are indicated. The electrolyte was $LiAsF_6$ in propylene carbonate. Theoretical cell capacity was approximately 3.99 ma·hr.

EXAMPLE 5

Figure 5:
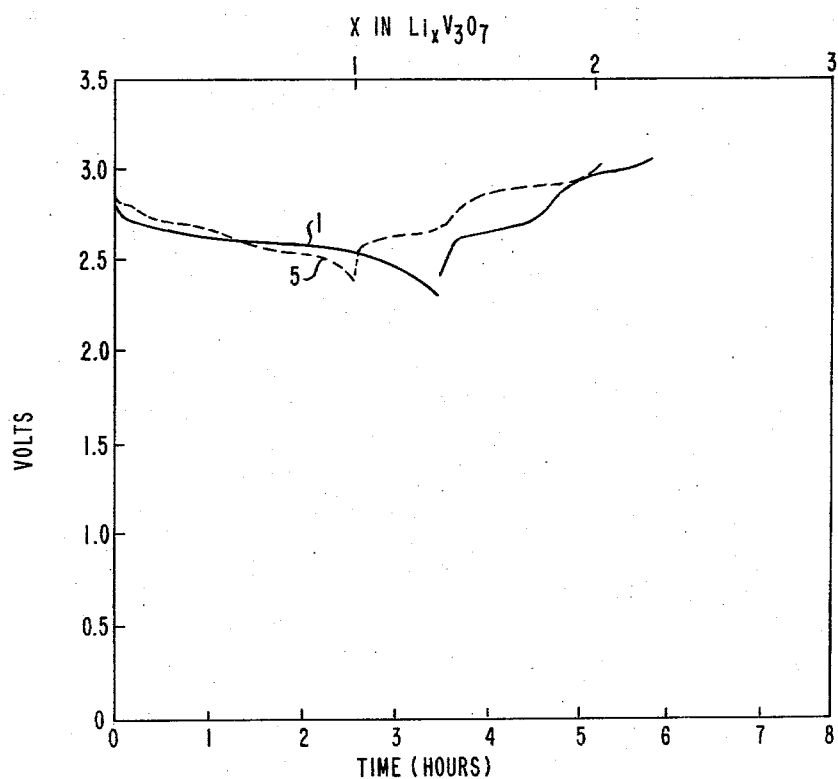
FIG. 5 plots the cell voltage for a cell using $V_3O_7$ as the active positive electrode material against both time, in hours, and lithium content, represented by x.

FIG. 5 relates for a cell using $V_3O_7$ as the active positive electrode material and having a lithium negative electrode, cell voltage, in volts, on the ordinate and both time, in hours, and lithium content on the abscissa. The positive electrode contained 2.52 mg of $V_3O_7$ and 17.5 mg of graphite. The electrolyte was 1.0 M $LiAsF_6$ in propylene carbonate. The cell was cycled at 0.1 ma. The cycle numbers are indicated. Theoretical cell capacity was approximately 0.77 ma·hr.

EXAMPLE 6

Figure 6:
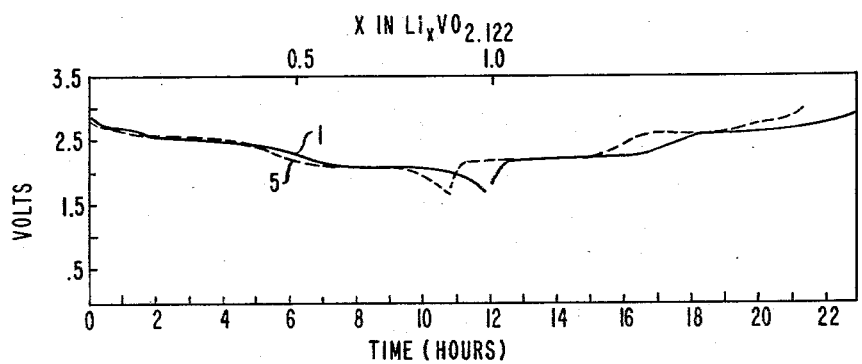
FIG. 6 plots the cell voltage for a cell using the vanadium oxide having the nominal atom composition $VO_{2.122}$ as the active positive electrode material against both time, in hours, and lithium content, represented by x.

FIG. 6 relates for a cell using as the active positive electrode material a vanadium oxide with nominal composition $VO_{2.122}$, prepared by controlled thermal decomposition of $NH_4VO_3$, and having a lithium negative electrode, cell voltage, in volts, on the ordinate, and both time, in hours, and lithium content on the abscissa. The cathode contained 7.95 mg of $VO_{2.122}$ and 7.95 mg of graphite. The electrolyte was 1.0 M $LiAsF_6$ in propylene carbonate. The cell was cycled at 0.2 ma. The cycle numbers are indicated. Theoretical cell capacity was approximately 2.51 ma·hr.

We claim:

1. A nonaqueous secondary cell comprising a negative electrode of lithium metal, an electrolyte and a positive electrode: CHARACTERIZED IN THAT said positive electrode comprises at least one vanadium oxide selected from the group consisting of $VO_2(B)$ and vanadium oxides having the nominal stoichiometry $VO_{2+y}$; y greater than 0.0 and less than or equal to approximately 0.4.

2. A nonaqueous secondary cell as recited in claim 1 in which said vanadium oxide consists of at least one member selected from the group consisting of $VO_2(B)$, $V_3O_7$, $V_4O_9$ and $V_6O_{13}$.

3. A nonaqueous secondary cell as recited in claim 2 in which said positive electrode further comprises electrically conducting material.

4. A nonaqueous secondary cell as recited in claim 3 in which said positive electrode has an electrical conductivity of at least $10(ohm\ cm)^{-1}$.

5. A nonaqueous secondary cell as recited in claim 2 or 4 in which said electrolyte comprises lithium hexafluoroarsenate in propylene carbonate.

6. A nonaqueous secondary cell as recited in claim 1 in which vanadium oxide has the nominal stoichiometry $VO_{2+y}$; y greater than or equal to 0.1 and less than or equal to 0.2.

7. A nonaqueous secondary cell as recited in claim 1 in which said vanadium oxide has a structure such as that resulting from thermally decomposing ammonium metavanadate in an inert or reducing atmosphere at a temperature of approximately 450 degrees C.

8. A nonaqueous secondary cell as recited in claim 7 in which the structure of said vanadium oxide is modified further by heat treating at temperature equal to or less than approximately 650 degrees C.

* * * * *

UNITED STATES PATENT AND TRADEMARK OFFICE
CERTIFICATE OF CORRECTION

PATENT NO. : 4,228,226

DATED : October 14, 1980

INVENTOR(S) : Paul A. Christian, Francis J. Di Salvo, Jr. and Donald W. Murphy

It is certified that error appears in the above—identified patent and that said Letters Patent is hereby corrected as shown below:

Column 1, line 35, "must" should read --much--; line 40, "or" should read --on--. Column 2, line 36, "$0 < y < 0.4$" should read --$0 \leq y \leq 0.4$--. Column 3, line 5, "by" should read --at--.

Signed and Sealed this

Twentieth Day of January 1981

[SEAL]

Attest:

RENE D. TEGTMEYER

*Attesting Officer*  *Acting Commissioner of Patents and Trademarks*